(12) United States Patent
Albrecht et al.

(10) Patent No.: US 10,706,080 B2
(45) Date of Patent: Jul. 7, 2020

(54) EVENT CLUSTERING AND EVENT SERIES CHARACTERIZATION BASED ON EXPECTED FREQUENCY

(71) Applicant: INTERNATIONAL BUSINESS MACHINES CORPORATION, Armonk, NY (US)

(72) Inventors: Conrad M. Albrecht, Yorktown Heights, NY (US); Marcus Freitag, Yorktown Heights, NY (US); Theodore Van Kessel, Yorktown Heights, NY (US); Siyuan Lu, Yorktown Heights, NY (US); Hendrik F. Hamann, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 333 days.

(21) Appl. No.: 15/720,779

(22) Filed: Sep. 29, 2017

(65) Prior Publication Data
US 2019/0102449 A1  Apr. 4, 2019

(51) Int. Cl.
*G06F 16/28* (2019.01)
*G06F 17/12* (2006.01)
*G06K 9/62* (2006.01)
*G06F 16/23* (2019.01)

(52) U.S. Cl.
CPC .......... *G06F 16/287* (2019.01); *G06F 17/12* (2013.01); *G06K 9/6218* (2013.01); *G06F 16/2336* (2019.01)

(58) Field of Classification Search
CPC .... G06F 16/287; G06F 17/12; G06F 16/2336; G06K 9/6218

USPC ......................................................... 707/737
See application file for complete search history.

(56) References Cited

U.S. PATENT DOCUMENTS

| | | | | |
|---|---|---|---|---|
| 2011/0085630 | A1* | 4/2011 | Gerber | H04L 43/087 375/359 |
| 2015/0169429 | A1* | 6/2015 | Balasubramanian | G06F 11/3636 717/128 |
| 2017/0359398 | A1* | 12/2017 | Li | H04L 65/602 |

OTHER PUBLICATIONS

Mung Chiang, et al., "Fog and IoT: An Overview of Research Opportunities," IEEE Internet of Things Journal, vol. 3, No. 6, Dec. 2016, pp. 854-864.

(Continued)

*Primary Examiner* — Evan Aspinwall
(74) *Attorney, Agent, or Firm* — F. Chau & Associates, LLC (57) ABSTRACT

A method for clustering time stamps in time series data includes receiving a one-dimensional array of ordered timestamps and an expected frequency; determining a set of time intervals; determining a first binary array that indicates whether each time interval in the set of time intervals is greater than or less than the expected frequency; determining a second binary array of differences between a corresponding pair of adjacent elements of the first binary array; appending an ith timestamp to one of a set of opening interval bounds, a set of closing interval bounds, or a set of isolated points; merging the set of set of opening interval bounds and the set of closing interval bounds into a set of cluster intervals τ; and outputting the set of cluster intervals and the set of isolated points.

20 Claims, 5 Drawing Sheets

(56) References Cited

OTHER PUBLICATIONS

Martin Ester, et al., "A Density-Based Algorithm for Discovering Clusters in Large Spatial Databases with Noise," Published in Proceedings of 2nd International Conference on Knowledge Discovery and Data Mining (KDD-96), 1996, pp. 1-6.

Alexander Hinneburg, et al., "An Efficient Approach to Clustering in Large Multimedia Databases with Noise," American Associated for Artificial Intelligence, pp. 58-65, 1998.

\* cited by examiner

EVENT CLUSTERING AND EVENT SERIES CHARACTERIZATION BASED ON EXPECTED FREQUENCY

TECHNICAL FIELD

Embodiments of the present disclosure are directed to a one-dimensional, one-parameter clustering method with linear complexity on input that quantifies data availability or measures the reliability/stability of a device connecting network, such as IoT.

DISCUSSION OF THE RELATED ART

The concept of Internet of Things (IoT) is intimately related to records of certain events, e.g. a network attached device capturing weather information to be broadcast to other devices for processing. Given (a) transmitter that frequently sends out such information every time interval $\Delta T$, and (b) receiver that keeps track of the timestamps when data was transmitted/recorded, a one-dimensional time series $t=\{t_i\}$, $i=1, \ldots, N$ stores information on failures of the recording/sending/transmission/receiving.

If the one-dimensional data t is clustered such that consecutive events are not more than $\Delta T$ apart, periods in time where data might be missing can be inferred. Upon detection, corresponding actions, such as retransmission, data interpolation, etc., can be performed. Moreover, the characteristics of intervals of no data, e.g., relative frequency, duration, etc., can help diagnose the status of the communication network.

Since general purpose, multi-dimensional clustering methods such as Fisher's discriminant, k-means clustering, or more generally expectation-maximization (EM) do not exploit the special property of ordering in one dimension, a simpler approach that does not need knowledge of the number of clusters/intervals can be used, that avoids density estimation.

SUMMARY

Exemplary embodiments of the present disclosure are directed to event clustering for application in IoT service quality characterization using a computer-implemented method with time complexity O(N). Embodiments exploit the natural ordering of a sequence of timestamps recorded by a receiver device to minimize computational complexity by a factor of O(log N). Given an expected frequency $\Delta T^{-1}$, an O(N)-efficient clustering procedure of N events represented by an ordered series of timestamps $t_1, t_2, \ldots, t_N$ can identify time intervals of missing data, locate isolated events, and characterize a series of events by varying $\Delta T$ to determine the quality of service over an IoT network.

According to an embodiment of the disclosure, there is provided a computer-implemented method for clustering time stamps in time series data, including the steps of: receiving, from an electrically connected network, a one-dimensional array t of ordered timestamps and an expected frequency dT, wherein N is a number of timestamps in the one-dimensional array t; determining a set of time intervals, wherein a time interval is determined between each pair of adjacent timestamps in the one-dimensional array t of ordered timestamps; determining a first binary array that indicates whether each time interval in the set of time intervals is greater than or less than the expected frequency dT; determining a second binary array, wherein each element of the second binary array is a difference between a corresponding pair of adjacent elements of the first binary array; appending an ith timestamp to a set of opening interval bounds $\tau-$ if a corresponding second binary array is equal to $-1$; appending an ith timestamp to a set of closing interval bounds $\tau+$ if a corresponding second binary array is equal to 1; appending an ith timestamp to a set of isolated points x if a next corresponding first binary array value is equal to 1; merging the set of set of opening interval bounds $\tau-$ and the set of closing interval bounds $\tau+$ into a set of cluster intervals $\tau$; and outputting the set of cluster intervals $\tau$ and the set of isolated points x.

According to a further embodiment of the disclosure, the electrically connected network is an Internet-of-things network.

According to a further embodiment of the disclosure, the electrically connected network is a network of satellites.

According to a further embodiment of the disclosure, the electrically connected network is a direct link to a database.

According to a further embodiment of the disclosure, the method includes determining a first service quality measure that measures a reliability of the electrically connected network from $$C_t^o(f) = \frac{1}{\Delta t}\sum_k |\tau_k| = \begin{cases} 1 & \Delta T \leq 0 \\ 0 \ldots 1, & 0 < \Delta T < \Delta t \\ 0 & \Delta T \geq \Delta t \end{cases}$$

wherein $\Delta t = t_N - t_1$ is a total time interval, and $f = \log [\Delta T^{-1}/(\Delta t/|t|)^{-1}] = -\log \Delta T |t|/\Delta t$, wherein $C_t^o(f)$ is a fraction of time with no operation failures in the electrically connected network.

According to a further embodiment of the disclosure, the method includes determining a second service quality measure that is a normed number of clusters from $$C_t^n(f) = 2\frac{|\tau| - \delta_{1|\tau|}}{|t|} = \begin{cases} 0 & \Delta T < 0 \\ 0 \ldots 1, & 0 \leq \Delta T < \Delta t \\ 0 & \Delta T \geq \Delta t \end{cases}$$

wherein $\Delta t = t_N - t_1$ is a total time interval, $f = \log [\Delta T^{-1}/(\Delta t/|t|)^{-1}] = -\log \Delta T |t|/\Delta t$, $|\tau|$ is a number of clusters, and $|t|$ is a number of time stamps.

According to a further embodiment of the disclosure, the method includes determining a third service quality measure that is a measure of a number of isolated events from $$C_t^s(f) = \frac{|x|}{|t|} = \begin{cases} 0 & \Delta T < 0 \\ 0 \ldots 1, & 0 \leq \Delta T < \Delta t \\ 0 & \Delta T \geq \Delta t \end{cases}$$

wherein $\Delta t = t_N - t_1$ is a total time interval, $f = \log [\Delta T^{-1}/(\Delta t/|t|)^{-1}] = -\log \Delta T |t|/\Delta t$, $|x|$ is a number of isolated points, and $|t|$ is a number of time stamps.

According to a further embodiment of the disclosure, the method includes determining the set of opening interval bounds $\tau-$ and the set of closing interval bounds $\tau+$ from $$\tau^\pm = \{\tau_k^\pm : k < k' \Rightarrow \tau_k^\pm < \tau_{k'}^\pm\}, k=1, \ldots, K \leq N/2 - 1,$$

and determining cluster intervals as $\tau_k = [\tau_{k-1}^-, \tau_k^+]$, $k=1, \ldots, K$.

According to a further embodiment of the disclosure, letting b represent the first binary array, $b[0]=1$ and $b[N]=1$.

According to an embodiment of the disclosure, there is provided a non-transitory program storage device readable by a computer, tangibly embodying a program of instructions executed by the computer to perform the method steps for clustering time stamps in time series data.

DETAILED DESCRIPTION OF EXEMPLARY EMBODIMENTS

Exemplary embodiments of the disclosure as described herein generally provide systems and methods for clustering and characterizing signal events on the IoT. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the disclosure provide a method to cluster timestamps based on an expected frequency of a service, e.g., an IoT domain, satellite images, etc., and output information that can be used to characterize the quality of a service, and thus rate reliability/stability of the service.

Further embodiments of the disclosure provide methods for randomly probing and clustering time series of point data satellite imagery stored in a database given the latitude and longitude coordinates, and to efficiently estimate the availability of geo-spatial data, given the constraint that it is practically intractable to scan the whole database.

One-Dimensional Clustering

Given a set of N ordered timestamps $t=\{t_i\}$, $i=1, \ldots, N$, i.e.

$$i \leq j \Rightarrow t_i \leq t_j \quad (1)$$

and an expected time interval $\Delta T$, time intervals $\tau_k$ are defined such that $$t_i, t_{i+1} \in \tau_k = [\tau_k^-, \tau_k^+] \Rightarrow \delta t_i = t_{i+1} - t_i \leq \Delta T. \quad (2)$$

Note that $\Delta T$ might be an external parameter to an algorithm that provides a solution or it can be defined by t itself, e.g. through $$\langle \delta t \rangle = \frac{1}{N} \sum_i \delta t_i.$$

The $\delta t_i$ need to be computed and therefore $\langle \delta t \rangle$ is efficiently determined along these lines.

To fulfill EQ. (2), of course, at least N−1 time intervals need to be computed:

$$\delta t\{\delta t_i = t_{i+1} - t_i\}, i=1, \ldots, N-1. \quad (3)$$

Whenever a new time series point $t_{N+1} > t_N$ is (randomly) added, there is no a priori way of determining from the existing $t_{i \leq N}$ whether $\Delta T$ is exceeded.

To classify the $t_i$ as interval bounds $\tau_k^\pm$, note that the binary sequence $$b=\{b_i = \text{int}(\delta t_i > \Delta T)\}, i=1, \ldots, N-1 \quad (4)$$

switches from 1 to 0 for an opening interval bound $\tau-$, and from 0 to 1 for a closing interval bound $\tau+$, only. The function int( ) has values int(True)→1 and int(False)→0. Hence the quantity $$B=\{B_i = b_i - b_{i-1}\}, i=2, \ldots, N-1 \text{ with } B_i \in \{-1, 0, 1\} \quad (5)$$

yields the desired association $$B_i = \pm 1 \Rightarrow t_i \in \tau^\pm, \quad (6)$$

Based on the property that the $t_i$ are ordered, as expressed by EQ. (1), then the binary (discrete) function $b_i$ implies the alternating property:

$$\forall i < j : 1 = B_i = B_j \Rightarrow \exists i < l < j : B_l = -1. \quad (7)$$

Thus, linearly scanning through the $t_i$ and their corresponding $B_i$ results in two sets $$\tau^\pm\{\tau_k^\pm : k < k' \Rightarrow \tau_k^\pm < \tau_{k'}^\pm\}, k=1, \ldots, K \leq N/2-1 \quad (8)$$

That can be interleaved to obtain the corresponding time intervals as a solution, EQ. (2).

Boundary Conditions

According to embodiments of the disclosure, there several options for interleaving the $\tau^\pm$, which depend on boundary conditions. More specifically, assume that the sequence $t_1, t_2, \ldots$ starts with, e.g., intervals that are smaller than $\Delta T$. In this case, $\tau_1^- > \tau_1^+$, and a $\tau_0^-$ one needs to manually added to construct intervals:

$$\tau_k = [\tau_{k-1}^-, \tau_k^+]. \quad (9)$$

A corresponding issue might occur at the end of the time series $\{t_i\}$, depending on whether $K^+ = |\tau^+|$ is equal or not equal to $K^- = |\tau^-|$. Note that by virtue of EQ. (7) the difference $|K^+ - K^-|$ is at most 1. However, due to the fact that $|B|=N-2 \neq |t|=N$, boundary values $\tau^\pm$ need to be manually added.

According to embodiments, to prevent manually dealing with all (four) different boundary condition scenarios, the following timestamps can be added from the outset:

$$t_0 = -\infty \text{ and } t_{N+1} = +\infty. \quad (10)$$

Hence, $\delta t_0 = \delta t_N = +\infty$, and therefore $$b_0 = b_N = 1 \quad (11)$$

which yields N $B_i$ that corresponding to N $t_i$ for classification such that $$\tau = \{\tau_k = [\tau_k^-, \tau_k^+]\}, k=1, \ldots, K \quad (12)$$

from $$\tau^\pm = \{\tau_k^\pm : k < k' \Rightarrow \tau_k^\pm < \tau_{k'}^\pm\}, k=1, \ldots, K \quad (13)$$

with $|\tau| = K \leq N/2$.

Isolated Points

According to embodiments, given the solution EQ. (12), due to the ordering of the $t_i$, open intervals $$\bar{\tau} = \{\bar{\tau}_k = (\tau_k^+, \tau_{k+1}^-)\}_{k=1, \ldots, K-1}, \quad (14)$$

can be formed that are associated with time intervals of failure. Note, that $[t_1, t_N] = \tau \cup \bar{\tau}$. However, these intervals do not imply $$\forall i,k: t_i \not\in \bar{\tau}_k, \quad (15)$$

i.e., informally, it is not true that no event occurs during the intervals f, but is true that $$\tau_i \in \bar{\tau}_k \Rightarrow |\tau_i - \tau_{i\pm 1}| > \Delta T \quad (16)$$

where $t_i$ is referred to as an isolated event. These timestamps can be considered to be noise, while all $\tau_i \not\in \tau^\pm$ are border points.

According to embodiments, isolated events have $b_i = 1$ and since they are not interval boundary points, they need to have $B_i = 0$. This way b and B can be used to classify isolated events according to $$B_i = 0 \land b_i = 1 \Rightarrow t_i \in x, \quad (17)$$

where x denotes the set of isolated timestamps. Likewise, clustered timestamps can be defined as $$B_i = 0 \land b_i = 0 \Rightarrow t_i \in \bar{x} \quad (18)$$

Since b is binary and EQ. (5) holds for B, all $t_i$ are uniquely classified, i.e. $t = \tau + \cup \tau - \cup x \cup \bar{x}$. According to embodiments, there is an association $x^{(-)} \leftrightarrow \tau^{(-)}$ in the sense that all $t_i \not\in x$ are within an interval of $\bar{\tau}$ and all $t_i \not\in \bar{x}$ are within an interval of $\tau$.

Implementation & Computational Complexity

Figure 1:
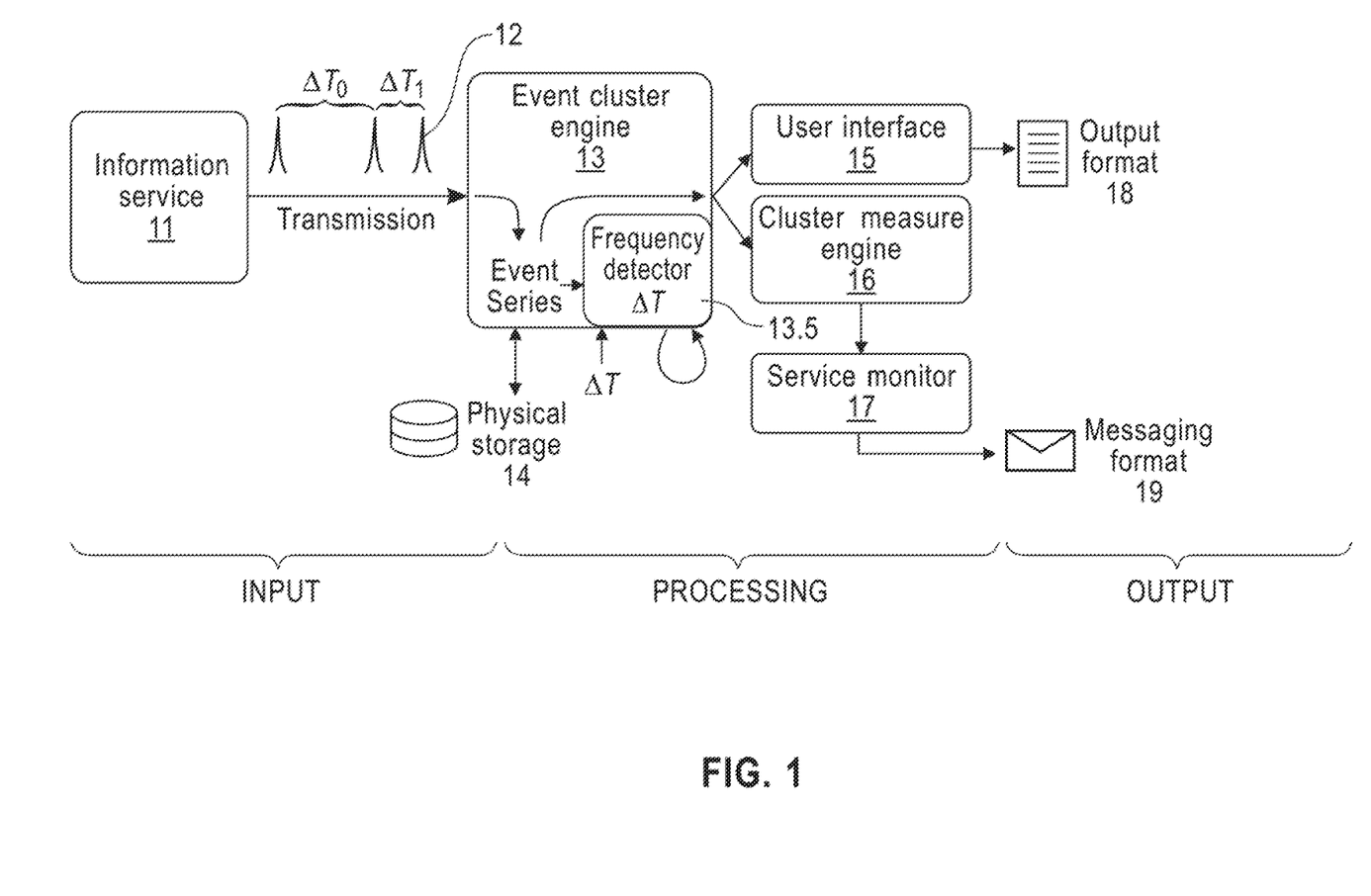
FIG. 1 is a block diagram of an exemplary system for implementation a method clustering a one-dimensional (1-D) time series of events, according to an embodiment of the disclosure.

FIG. 1 is a block diagram of an exemplary system that implements a method for clustering a 1-D time series of events, according to an embodiment of the disclosure. Referring now to the figure, an information service 11, such as an IoT device or a geo-spatial database, transmits a time series 12 of information packets through a network, such as, e.g., the Internet which employs physical networks such as e.g. a WiFi network, the Ethernet, etc., to an event cluster engine 3. The event cluster engine 13 includes a frequency detector 13.5, that can receive an event frequency $\Delta T$ that was manually input by a user or automatically determined from an average of the event intervals in the data. The event cluster engine 13 can store the time series data in physical storage 14, such as memory or a hard drive, etc. The time series data includes cluster intervals demarcated by respective start and end boundaries $\tau_n^-$ and $\tau_n^+$, $\tau_{n+1}^-$ and $\tau_{n+1}^+$, etc., and isolated points $t_m$, $t_{m+1}$, $t_{m+2}$, etc. A user can interact with the event cluster engine 13 via a user interface 15, such as a RESTful API service, to, e.g., generate output, 18, such as a JSON text file. The event cluster engine 13 is also connected to a cluster measure engine 16, that can calculate various cluster measures, as described below. The cluster measures can be sent to a service monitor 17, such as, e.g., Ganglia (http://ganglia.info/) or Nagios (https://www.nagios.com/), that can determine the reliability or stability of the information service 11 based on the cluster measures, and generate suitable warning messages 19, such as email or Apache Kafka (https://kafka.apache.org/) messages, etc.

Figure 3:
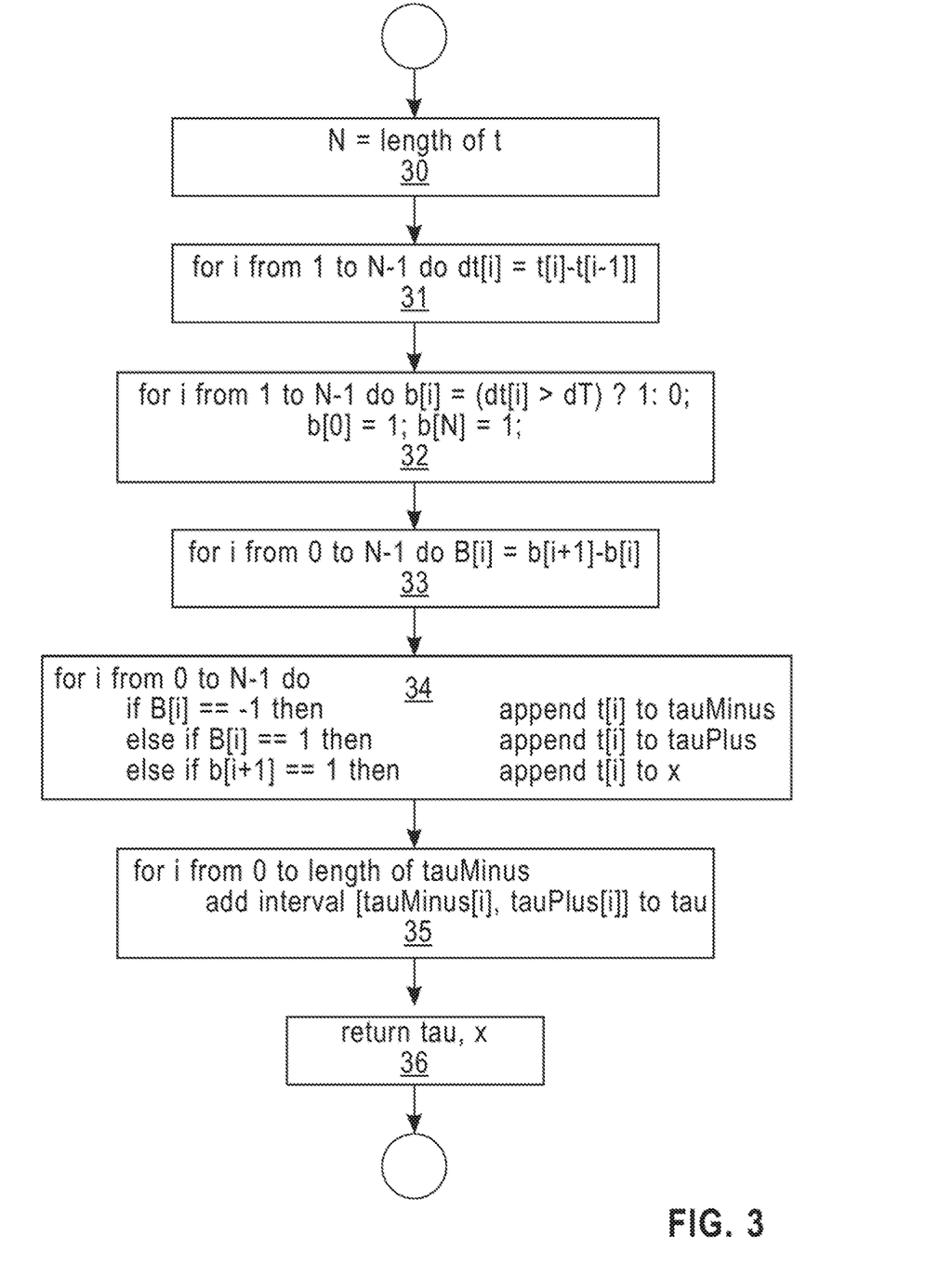
FIG. 3 is a flowchart of a method of clustering a 1-D time series of events, according to an embodiment of the disclosure.

The following listing provides a pseudo-code implementation according to an embodiment of a method of clustering a 1-D time series of events, with reference to steps numbers of the flowchart of FIG. 3.

```
algorithm cluster_events is
input: one-dimensional array t of ordered timestamps to cluster,
    expected frequency dT
output: set of cluster intervals tau, list of isolated timestamps x
define ordered list tauMinus, tanPlus, x
define set tau
```

-continued

```
define array dt, b, B
N = length of t                                          // Step 30
for i from 1 to N-1 do dt[i] = t[i]-t[i-1] ]             // Step 31
b[0] = 1                                                 // Step 32
for i from 1 to N-1 do
    if dt[i] > dT then    b[i] = 1
    else                  b[i] = 0
b[N] = 1
for i from 0 to N-1 do B[i] = b[i+1]-b[i]                // Step 33
for i from 0 to N-1 do                                   // Step 34
    if B[i] == -1 then          append t[i] to tauMinus
    else if B[i] == 1 then      append t[i] to tauPlus
    else if b[i+1] == 1 then    append t[i] to x
for i from 0 to length of tauMinus                       // Step 35
    add interval [tauMinus[i], tauPlus[i]] to tau
return tau, x                                            // Step 36
```

For example, a call of cluster_events(t, dT) on
  t=[−20, −18, 1, 2, 2.9, 10, 11, 100, 200, 202, 202, 203]
given
  dT as −1, 0, 1, 10, 100,
which equals to $\Delta T$, returns output equivalent to
  [ ], [−20, −18, 1, 2, 2.9, 10, 11, 100, 200, 202, 202, 203]
  [[202, 202]], [−20, −18, 1, 2, 2.9, 10, 11, 100, 200, 203]
  ([(1, 2.9), (10, 11), (202, 203)], [−20, −18, 100, 200]
  ([(−20, −18), (1, 11), (200, 203)], [100]
  [(−20, 203)], [ ]
  [(−20, 11), (200, 203)], [100]
respectively. In the above output listing, the bracketed quantities on the left are the cluster intervals $\tau$, the bracketed quantities on the right are the isolated points x. Square brackets with comma separated elements denote list data structures. In the first line, r is empty, as indicated by the [ ], and thus each time stamp is classified as an isolated point.

According to an embodiment of the disclosure, the above pseudo-code listing can be implemented in any suitable computer language, such as Python or C/C++. An efficient implementation in C/C++ uses N−1 algebraic operations for δt, N−2 logical operations for b and again N algebraic operations for B which determines the interval boundary classification with a total of 3(N−1) operations.

A naive approach would compute two time intervals for each $t_i$, and perform two logical operations of those against $\Delta T$, which would determine the classification, hence 4N computations.

As a further example according to an embodiment, a sample JSON load for a query to the user interface 15 of FIG. 1 in the case of a data availability service of geo-spatial satellite images in a database such as IBM PAIRS (https://pairs.res.ibm.com) may be:

```
{ "query": {
    "datalayer-IDs": [ 23, 15100, 3],
    "data-frequencies": [ 3800, 90000, 2800000],
    "start-UTC-time": [ 2016, 10, 1],
    "aoi": { "type": "Polygon",
        "coordinates": [[[−73.9, 40.5], [ −73.8, 40.55],
        [ −73.85, 40.6], [ −73.9, 40.5]]] },
    "explore": false,
    "end-UTC-time": [ 2016, 12, 31, 23, 59, 59 ]
} }
``` and a sample JSON text file response, output format 18 of FIG. 1, might look like, e.g.,

```
{ "layers-available": [{
    "time-intervals": [[ 1483001560, 1490001110],
        [1653006000, 1680282350 ]],
    "avail-flag": 0,
    "datalayer-ID": 1234,
    "num-timestamps": 346,
```

-continued

```
    "timestamps": [ 893001560, 1093001560, 1260340121],
    "data-frequency": 31536000 }],
  "aoi": {"type": "Polygon",
      "coordinates": [[[ -73.9, 40.5], [ -73.8, 40.55],
        [ -73.85, 40.6], [-73.9, 40.5]]] }
}
```

In the above JSON listings:

"layers available" is a list of existing layers with their temporal data coverage for an area of interest specified by "aoi";

"time intervals" is a collection of time intervals [start, end] in Unix epoch time, which is $\tau_k$ from the One-dimensional Clustering section above;

"avail-flag" indicates whether data is found for a specified time interval—0 indicates data is found;

"datalayer-ID" is a database datalayer ID associated with the coverage information;

"num-timestamps" is the number of distinct timestamps discovered on probing "aoi";

"timestamps" is the list of isolated timestamps in Unix epoch time, as described in the Isolated Points section above;

"data-frequency" is the expected temporal interval $\Delta T$ in seconds in which a layer's data is available;

"aoi" refers to a spatial area of interest for which to check for data coverage;

"type" is the type of an aoi, which needs to be a simple polygon for this example;

"coordinates" are the longitude and latitude of the aoi polygon;

"datalayer-IDs" is a list of datalayer IDs to check data coverage for;

"data-frequencies" is a list of time periods $\Delta T$ of data in seconds on which data availability intervals are computed;

"start-UTC-time" is the data coverage start UTC time in the format of [year, month, day, hours, minutes, seconds] where hours range from 0 to 23;

"explore" triggers whether to randomly pick points in aoi for probing the time series; and "end-UTC-time" is the data coverage end UTC time in the "start-UTC-time" format.

As another example, given geo-spatial areas, a method according to an embodiment can determine whether there is any data at all. A method according to an embodiment randomly probes a time series at various locations and merges the timestamps of all these probes together. Then a cluster_events method such as that detailed above is applied to the time series.

Time Series Cluster Characterizations

According to embodiments, observe that for a given, fixed event series t with total time interval $\Delta t = t_N - t_1$, the quantity $$C_t^o(f) = \frac{1}{\Delta t} \sum_k |\tau_k| = \begin{cases} 1 & \Delta T \leq 0 \\ 0 \ldots 1, & 0 < \Delta T < \Delta t \\ 0 & \Delta T \geq \Delta t \end{cases}$$

where $$f = \log [\Delta T^{-1}/(\Delta t/|t|)^{-1}] = -\log \Delta T|t|/\Delta t \quad (20)$$

computes the fraction of time with no operation failures. $\Delta T$ is fixed by the expected, logarithmic, and normalized event frequency f, i.e. f=0 represents the scale of frequency where all timestamps are equally spaced within the time series interval, f>0 corresponds to smaller scales, f<0 to larger ones.

According to embodiments, scanning $C_t^o$ by varying f provides a characteristic that quantifies the reliability of, e.g., an IoT service. It can be shown that $C_t^o$ is monotonically decreases as f increases. This is because for larger $\Delta T$, more clusters $\tau$ cover the whole time series. Due to EQ. (2), clusters never shrink in size for increasing $\Delta T$; they either grow or merge to bigger clusters, letting the overall coverage increase.

According to embodiments, in a case where the time series is generated by a single, periodic data stream, a unit step function $C_t^o(f) = \Theta(-f)$ is obtained, i.e. $\Theta=1$ for f<0 and $\Theta=0$ for f>0. Nevertheless, similar information could be obtained by simply checking a histogram n($\delta t$), cf. EQ. (3), that counts the number of intervals $\delta t_i$ for some binning interval. In the case above, there would be a single peak in n($\delta t$). Note that $C_t^o$ contains information similar to $$\frac{1}{\Delta t} \int_0^{\Delta T} n(\delta t) d\delta t.$$

However, a clustering output ($\tau$, x) according to an embodiment provides information that n($\delta t$) is blind to, because n($\delta t$) does not account for the ordering of the $\delta t_i$. In particular, $$C_t^n(f) = 2 \frac{|\tau| - \delta_{1|\tau|}}{|t|} = \begin{cases} 0 & \Delta T < 0 \\ 0 \ldots 1, & 0 \leq \Delta T < \Delta t \\ 0 & \Delta T \geq \Delta t \end{cases} \quad (21)$$

provides a normed measure of the number of clusters, since the Kronecker delta $\delta_{ij}$ is 1 for i=j, 0 otherwise. It forces $|\tau| \in \{0, 1\}$ to result in $C_t^n = 0$. While $C_t^o$ just quantifies the total coverage of t by the clusters, $C_t^n$ provides insight whether the coverage is established by a number of patches or a single/a few intervals with data frequency of at least $\Delta T-1$. This way conclusions may be drawn on, e.g., the reliability of an IoT service. Ideally, $C_t^n \ll 1$.

Finally, according to embodiments, consider the number of isolated events $$C_t^s(f) = \frac{|x|}{|t|} = \begin{cases} 0 & \Delta T < 0 \\ 0 \ldots 1, & 0 \leq \Delta T < \Delta t, \\ 0 & \Delta T \geq \Delta t \end{cases} \quad (22)$$

as an additional indicator of reliability, since they are orthogonal to the information contained in $\tau$. Isolated events can be classified as indicators of loose IoT service quality and thus should stay close to zero until it quickly increases to one for some f>0.

Figure 2:
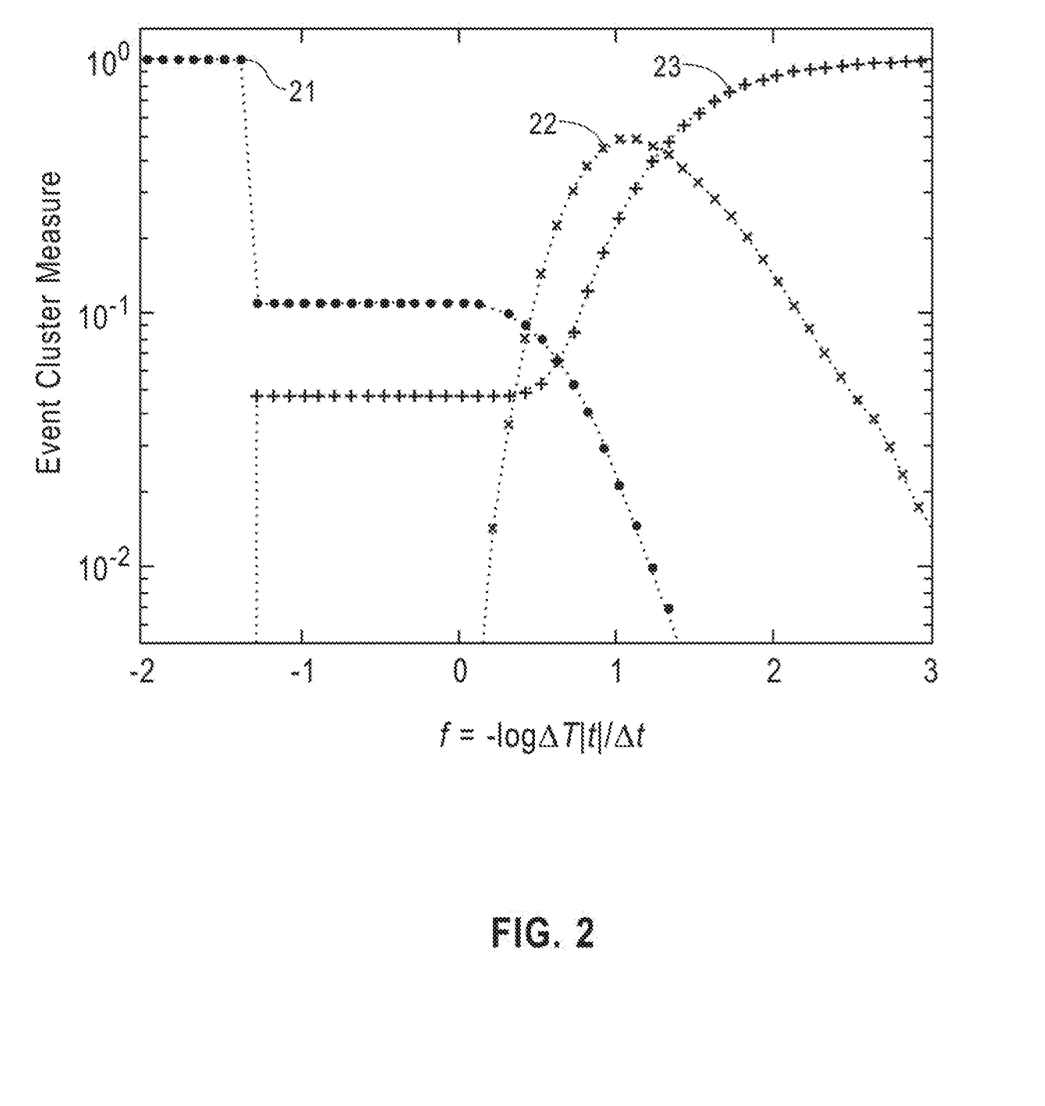
FIG. 2 is a sample plot of IoT service quality measures from event time series obtained by varying $\Delta T$, according to an embodiment of the disclosure.

FIG. 2 illustrates these applications by plotting $C_t^{o,n,s}$ for an event series t generated from $10^4$ uniformly random samples drawn from [0, 1] joined by $10^3$ equi-distant samples in [1, 10]. FIG. 2 is a sample plot of IoT service quality measures from event series t: $C_t^o$ 21, $C_t^n$ 22, and $C_t^s$ 23 by varying $\Delta T$. The series t comprises a burst of random events that covers approximately 10% of the total time range $\delta t$. During the rest of the time the events are periodic at a rate of about 1/50$\Delta t$. Note that at f=0 there is little variance in $C_t^{o,s}$, indicating that there is no single dominant event frequency $v_0=|t|/\Delta t$. Moreover, there is a step in $C_t^o$ at f≈−1 that covers 90% of its range which refers to a dominant event frequency one order of magnitude lower than $v_0$. Since $C_t^n\ll 1$. It is concluded that this frequency is present along major time intervals within $[t_1, t_N]$. Also, $C_t^s$ rapidly drops. Therefore, the existence of isolated events vanishes at time scales larger than ~$\Delta T/10v_0$ such that there is a clean signal.

In contrast, $C_t^n$~1 for f≈1. Thus, due to the randomness introduced into the sample, for high-frequency events, increasing coverage of $[t_1, t_N]$ is achieved by a number of isolated clusters, due to the random nature of the signal. Finally, for frequencies 3 orders of magnitude larger than $v_0$, $C_f^s$≈1, i.e. no more clustering of events occurs.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
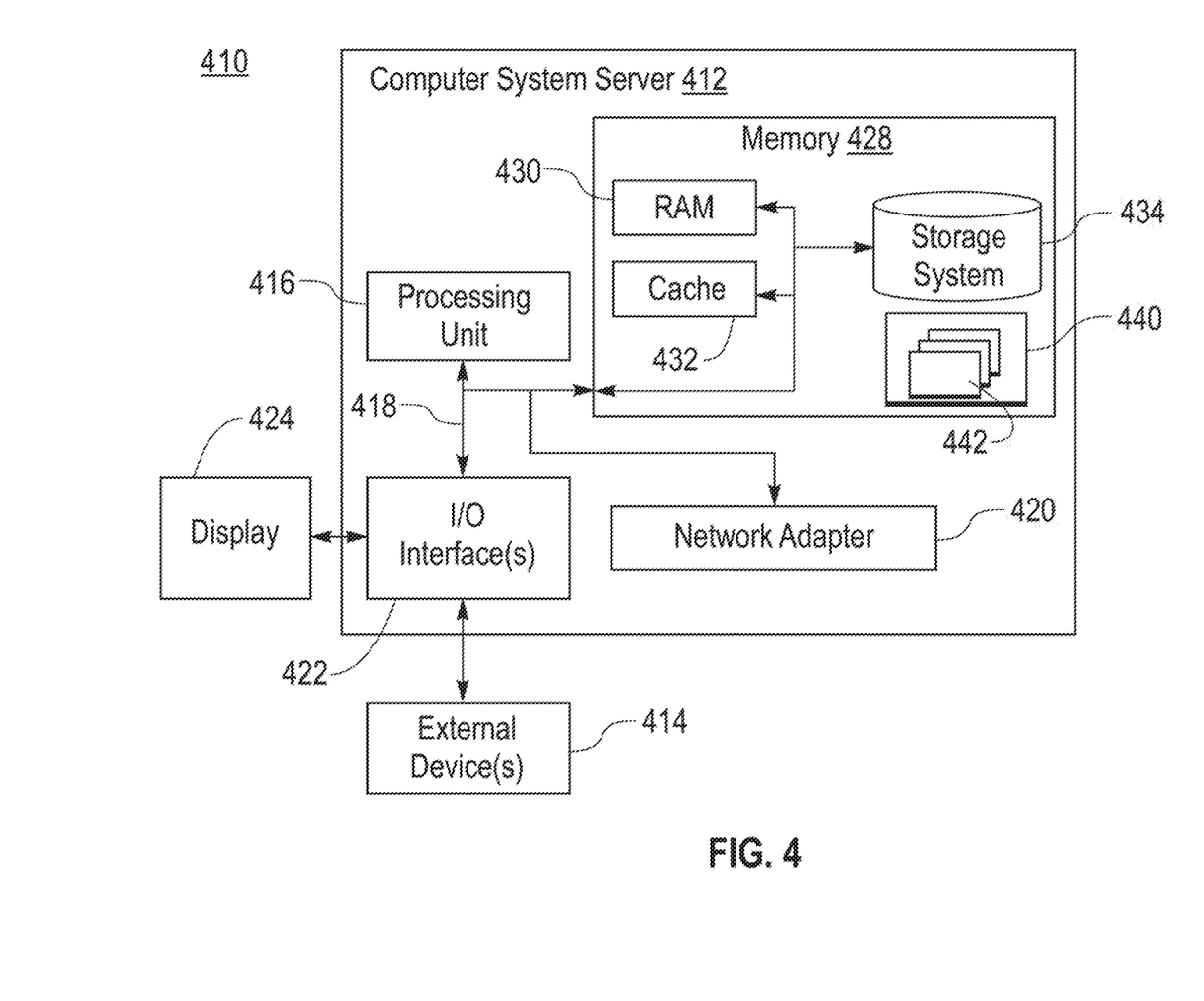
FIG. 4 is a schematic of an exemplary cloud computing node that implements an embodiment of the disclosure.

Referring now to FIG. 4, a schematic of an example of a cloud computing node is shown. Cloud computing node 410 is only one example of a suitable cloud computing node and is not intended to suggest any limitation as to the scope of use or functionality of embodiments of the disclosure described herein. Regardless, cloud computing node 410 is capable of being implemented and/or performing any of the functionality set forth herein above.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the disclosure as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
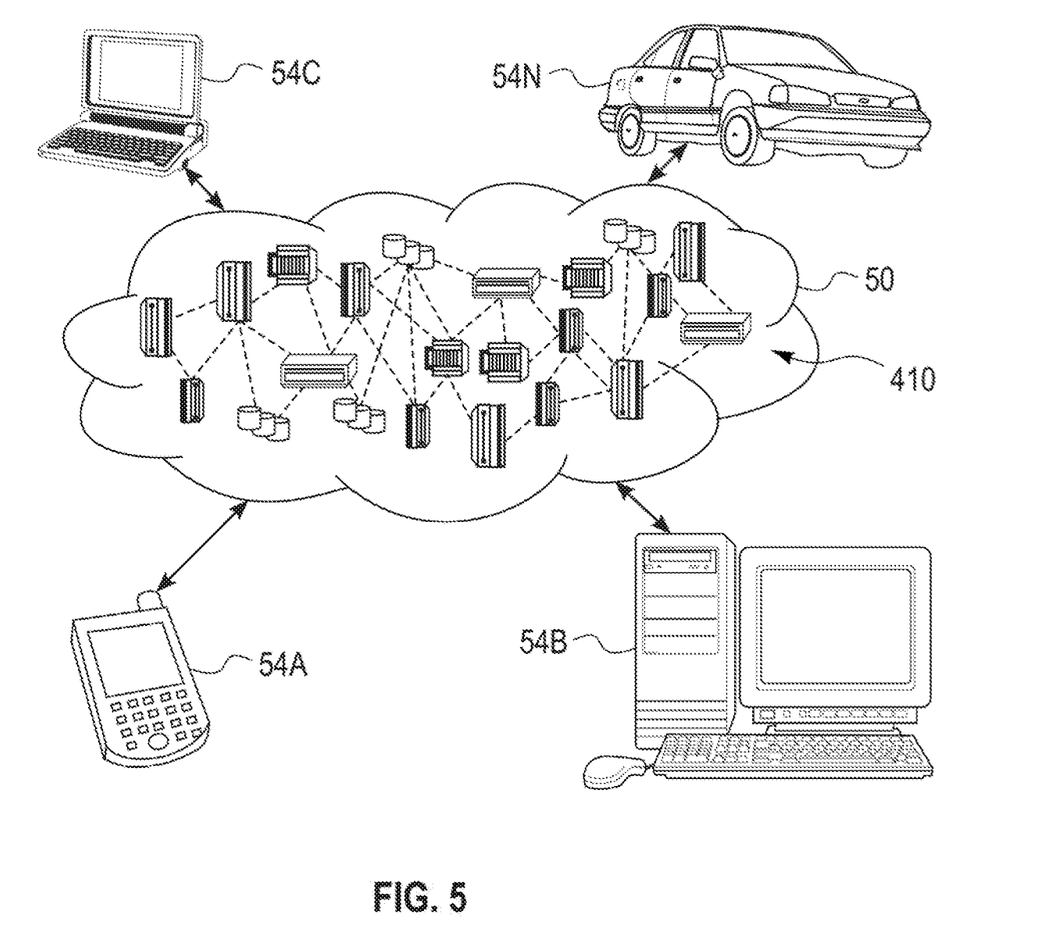
FIG. 5 shows an exemplary cloud computing environment according to embodiments of the disclosure.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 900 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer-implemented method of clustering time stamps in time series data, comprising the steps of:

receiving, from an electrically connected network, a one-dimensional array t of ordered timestamps and an expected frequency dT, wherein N is a number of timestamps in the one-dimensional array t;

determining a set of time intervals, wherein a time interval is determined between each pair of adjacent timestamps in the one-dimensional array t of ordered timestamps;

determining a first binary array that indicates whether each time interval in the set of time intervals is greater than or less than the expected frequency dT;

determining a second binary array, wherein each element of the second binary array is a difference between a corresponding pair of adjacent elements of the first binary array;

appending an ith timestamp to a set of opening interval bounds τ− if a corresponding second binary array is equal to −1;

appending an ith timestamp to a set of closing interval bounds τ+ if a corresponding second binary array is equal to 1;

appending an ith timestamp to a set of isolated points x if a next corresponding first binary array value is equal to 1;

merging the set of opening interval bounds τ− and the set of closing interval bounds τ+ into a set of cluster intervals τ;

outputting the set of cluster intervals τ and the set of isolated points x; and using said set of cluster intervals and said set of isolated points to determine a reliability of said electrically connected network and generate messages indicative of the reliability of said electrically connected network.

2. The method of claim 1, wherein the electrically connected network is an Internet-of-things network.

3. The method of claim 1, wherein the electrically connected network is a network of satellites.

4. The method of claim 1, wherein the electrically connected network is a direct link to a database.

5. The method of claim 1, further comprising determining a first service quality measure that measures a reliability of the electrically connected network from $$C_t^o(f) = \frac{1}{\Delta t}\sum_k |\tau_k| = \begin{cases} 1 & \Delta T \leq 0 \\ 0 \ldots 1, & 0 < \Delta T < \Delta t \\ 0 & \Delta T \geq \Delta t \end{cases}$$

wherein $\Delta t = t_N - t_1$ is a total time interval, and $f = \log[\Delta T^{-1}/(\Delta t/|t|)^{-1}] = -\log \Delta T|t|/\Delta t$, wherein $C_t^o(f)$ is a fraction of time with no operation failures in the electrically connected network.

6. The method of claim 1, further comprising determining a second service quality measure that is a normed number of clusters from $$C_t^n(f) = 2\frac{|\tau| - \delta_{1|\tau|}}{|t|} = \begin{cases} 0 & \Delta T < 0 \\ 0 \ldots 1, & 0 \leq \Delta T < \Delta t \\ 0 & \Delta T \geq \Delta t \end{cases}$$

wherein $\Delta t = t_N - t_1$ is a total time interval, $f = \log[\Delta T^{-1}/(\Delta t/|t|)^{-1}] = -\log \Delta T|t|/\Delta t$, $|\tau|$ is a number of clusters, and $|t|$ is a number of time stamps.

7. The method of claim 1, further comprising determining a third service quality measure that is a measure of a number of isolated events from $$C_t^s(f) = \frac{|x|}{|t|} = \begin{cases} 0 & \Delta T < 0 \\ 0 \ldots 1, & 0 \leq \Delta T < \Delta t \\ 0 & \Delta T \geq \Delta t \end{cases}$$

wherein $\Delta t = t_N - t_1$ is a total time interval, $f = \log[\Delta T^{-1}/(\Delta t/|t|)^{-1}] = -\log \Delta T|t|/\Delta t$, $|x|$ is a number of isolated points, and $|t|$ is a number of time stamps.

8. The method of claim 1, further comprising determining the set of opening interval bounds τ− and the set of closing interval bounds τ+ from $$\tau^+ = \{\tau_k^+ : k < k' \Rightarrow \tau_k^+ < \tau_{k'}^+\}, k = 1, \ldots, K \leq N/2 - 1,$$

and determining cluster intervals as $\tau_k = [\tau_{k-1}^-, \tau_k^+]$, k=1, ..., K.

9. The method of claim 1, wherein, letting b represent the first binary array, b[0]=1 and b[N]=1.

10. A non-transitory program storage device readable by a computer, tangibly embodying a program of instructions executed by the computer to perform the method steps for clustering time stamps in time series data, the method comprising the steps of:

receiving, from an electrically connected network, a one-dimensional array t of ordered timestamps and an expected frequency dT, wherein N is a number of timestamps in the one-dimensional array t;

determining a set of time intervals, wherein a time interval is determined between each pair of adjacent timestamps in the one-dimensional array t of ordered timestamps;

determining a first binary array that indicates whether each time interval in the set of time intervals is greater than or less than the expected frequency dT;

determining a second binary array, wherein each element of the second binary array is a difference between a corresponding pair of adjacent elements of the first binary array;

appending an ith timestamp to a set of opening interval bounds τ− if a corresponding second binary array is equal to −1;

appending an ith timestamp to a set of closing interval bounds τ+ if a corresponding second binary array is equal to 1;

appending an ith timestamp to a set of isolated points x if a next corresponding first binary array value is equal to 1;

merging the set of set-e-opening interval bounds τ− and the set of closing interval bounds τ+ into a set of cluster intervals τ; and outputting the set of cluster intervals τ and the set of isolated points x; and using said set of cluster intervals and said set of isolated points to determine a reliability of said electrically connected network and generate messages indicative of the reliability of said electrically connected network.

11. The computer readable program storage device of claim 10, wherein the electrically connected network is an Internet-of-things network.

12. The computer readable program storage device of claim 10, wherein the electrically connected network is a network of satellites.

13. The computer readable program storage device of claim 10, wherein the electrically connected network is a direct link to a database.

14. The computer readable program storage device of claim 10, the method further comprising determining a first service quality measure that measures a reliability of the electrically connected network from $$C_t^o(f) = \frac{1}{\Delta t}\sum_k |\tau_k| = \begin{cases} 1 & \Delta T \leq 0 \\ 0 \ldots 1, & 0 < \Delta T < \Delta t \\ 0 & \Delta T \geq \Delta t \end{cases}$$

wherein $\Delta t = t_N - t_1$ is a total time interval, and $f = \log[\Delta T^{-1}/(\Delta t/|t|)^{-1}] = -\log \Delta T|t|/\Delta t$, wherein $C_t^o(f)$ is a fraction of time with no operation failures in the electrically connected network.

15. The computer readable program storage device of claim 10, the method further comprising determining a second service quality measure that is a normed number of clusters from $$C_t^n(f) = 2\frac{|\tau| - \delta_{1|\tau|}}{|t|} = \begin{cases} 0 & \Delta T < 0 \\ 0 \ldots 1, & 0 \leq \Delta T < \Delta t \\ 0 & \Delta T \geq \Delta t \end{cases}$$

wherein $\Delta t = t_N - t_1$ is a total time interval, $f = \log[\Delta T^{-1}/(\Delta t/|t|)^{-1}] = -\log \Delta T|t|/\Delta t$, $|\tau|$ is a number of clusters, and $|t|$ is a number of time stamps.

16. The computer readable program storage device of claim 10, the method further comprising determining a third service quality measure that is a measure of a number of isolated events from $$C_t^s(f) = \frac{|x|}{|t|} = \begin{cases} 0 & \Delta T < 0 \\ 0 \ldots 1, & 0 \leq \Delta T < \Delta t \\ 0 & \Delta T \geq \Delta t \end{cases}$$

wherein $\Delta t = t_N - t_1$ is a total time interval, $f = \log[\Delta T^{-1}/(\Delta t/|t|)^{-1}] = -\log \Delta T|t|/\Delta t$, $|x|$ is a number of isolated points, and $|t|$ is a number of time stamps.

17. The computer readable program storage device of claim 10, the method further comprising determining the set of opening interval bounds τ− and the set of closing interval bounds τ+ from $$\tau^{\pm} = \{\tau_k^{\pm} : k < k' \Rightarrow \tau_k^{\pm} < \tau_{k'}^{\pm}\}, k = 1, \ldots, K \leq N/2 - 1,$$

and determining cluster intervals as $\tau_k = [\tau_{k-1}^-, \tau_k^+]$, $k = 1, \ldots, K$.

18. The computer readable program storage device of claim 10, wherein, letting b represent the first binary array, b[0]=1 and b[N]=1.

19. The method of claim 4, further comprising using said set of cluster intervals to determine an availability of data on said database, when scanning said database is intractable.

20. The computer readable program storage device of claim 13, the method further comprising using said set of cluster intervals to determine an availability of data on said database, when scanning said database is intractable.

* * * * *